United States Patent [19]

Miranti, Jr.

[11] Patent Number: 4,618,334

[45] Date of Patent: * Oct. 21, 1986

[54] BELT PULLEY AND METHOD OF MAKING THE SAME

[75] Inventor: Joseph P. Miranti, Jr., Porter Township, Christian County, Mo.

[73] Assignee: Dayco Corporation, Dayton, Ohio

[ * ] Notice: The portion of the term of this patent subsequent to Jul. 23, 2002 has been disclaimed.

[21] Appl. No.: 757,561

[22] Filed: Jul. 22, 1985

Related U.S. Application Data

[62] Division of Ser. No. 383,855, Jun. 1, 1982, Pat. No. 4,530,680.

[51] Int. Cl.$^4$ ............................................. F16H 57/04
[52] U.S. Cl. ................................ 474/93; 188/264 A; 192/113 A; 474/188
[58] Field of Search ............ 474/93, 188; 188/264 A, 188/264 AA; 192/113 A, 113 R

[56] References Cited

U.S. PATENT DOCUMENTS

| | | | |
|---|---|---|---|
| 1,385,396 | 7/1921 | Rayburn | 474/93 |
| 1,433,828 | 10/1922 | Kimble | 474/93 |
| 1,443,541 | 1/1923 | Kimble | 474/93 |
| 2,251,539 | 8/1941 | Ash | 188/264 AA X |
| 3,455,419 | 7/1969 | Miquel | 188/264 A X |
| 4,530,680 | 7/1985 | Miranti, Jr. | 474/93 |

FOREIGN PATENT DOCUMENTS 399028  9/1933  United Kingdom .......... 192/113 A

*Primary Examiner*—Rodney H. Bonck
*Assistant Examiner*—Dwight G. Diehl
*Attorney, Agent, or Firm*—Joseph V. Tassone

[57] ABSTRACT

A belt pulley and method of making the same are provided, the pulley having a hub and a peripheral groove for receiving part of an endless belt therein that is to drive the pulley or be driven thereby whereby the pulley is adapted to be rotated about the axis of the hub. The pulley has at least one passage provided with an inlet adjacent the hub and an outlet adjacent the peripheral groove whereby fluid passing through the passage from the inlet to the outlet thereof will tend to cool the pulley and/or the belt as the pulley rotates about the axis of the hub. A rotatably operable fluid flow forcing unit is carried by the pulley so as to be rotated and thereby operated in unison with the pulley and is disposed upstream from the inlet for forcing fluid into the inlet and thus through the passage as the pulley and the fluid flow forcing unit rotate about the axis of the hub.

2 Claims, 6 Drawing Figures

BELT PULLEY AND METHOD OF MAKING THE SAME

This is a division, of application Ser. No. 383,855, filed June 1, 1982, now U.S. Pat. No. 4,530,680, issued July 23, 1985.

BACKGROUND OF THE INVENTION

1. Field of the Invention

This invention relates to an improved belt pulley and to a method of making such a belt pulley or the like.

2. Prior Art Statement

It is known to applicant to provide a belt pulley having a hub and a peripheral groove for receiving part of an endless belt therein that is to drive the pulley or be driven thereby whereby the pulley is adapted to be rotated about the axis of the hub, the pulley having means defining at least one passage means provided with an inlet adjacent the hub and an outlet adjacent the peripheral groove whereby fluid passing through the passage means from the inlet to the outlet thereof will tend to cool the pulley and/or the belt as the pulley rotates about the axis of the hub. It has been suggested that an externally mounted fan or blower can be disposed adjacent such a belt pulley to additionally force air into the inlet of the passage means and, thus, through the passage means to augment the air flow through the passage means of the pulley.

For example, see the copending patent application, Ser. No. 383,845, filed June 1, 1982 now U.S. Pat. No. 4,509,933 of Joseph P. Miranti, Jr. et al.

SUMMARY OF THE INVENTION

It is one feature of this invention to provide a belt pulley having improved means for cooling the same.

In particular, it is believed according to the teachings of this invention that a rotatably operable fluid flow forcing means can be carried by a pulley so as to be rotated and thereby operated in unison with the pulley in a manner to force fluid into an inlet of a cooling passage means of the belt pulley as the belt pulley and the fluid flow forcing unit rotate about the axis of the hub of the pulley to tend to cool the pulley and/or the belt thereof. In this manner, it is believed that the operating temperature of a belt utilized with such a pulley will be reduced and thereby have its belt life increased.

For example, one embodiemnt of this invention provides a belt pulley having a hub and a peripheral groove for receiving part of an endless belt therein that is to drive the pulley or be driven thereby whereby the pulley is adapted to be rotated about the axis of the hub, the pulley having means defining at least one passage means provided with an inlet adjacent the hub and an outlet adjacent the peripheral groove whereby fluid passing through the passage means from the inlet to the outlet thereof will tend to cool the pulley and/or the belt as the pulley rotates about the axis. A rotatably operable fluid flow forcing means is carried by the pulley so as to be rotated and thereby operated in unison with the pulley and is disposed upstream from the inlet for forcing fluid into the inlet and thus through the passage means as the pulley and the fluid flow forcing means rotate about the axis of the hub.

Accordingly, it is an object of this invention to provide an improved belt pulley having one or more of the novel features of this invention as set forth above or hereinafter shown or described.

Another object of this invention is to provide an improved method of making such a belt pulley, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
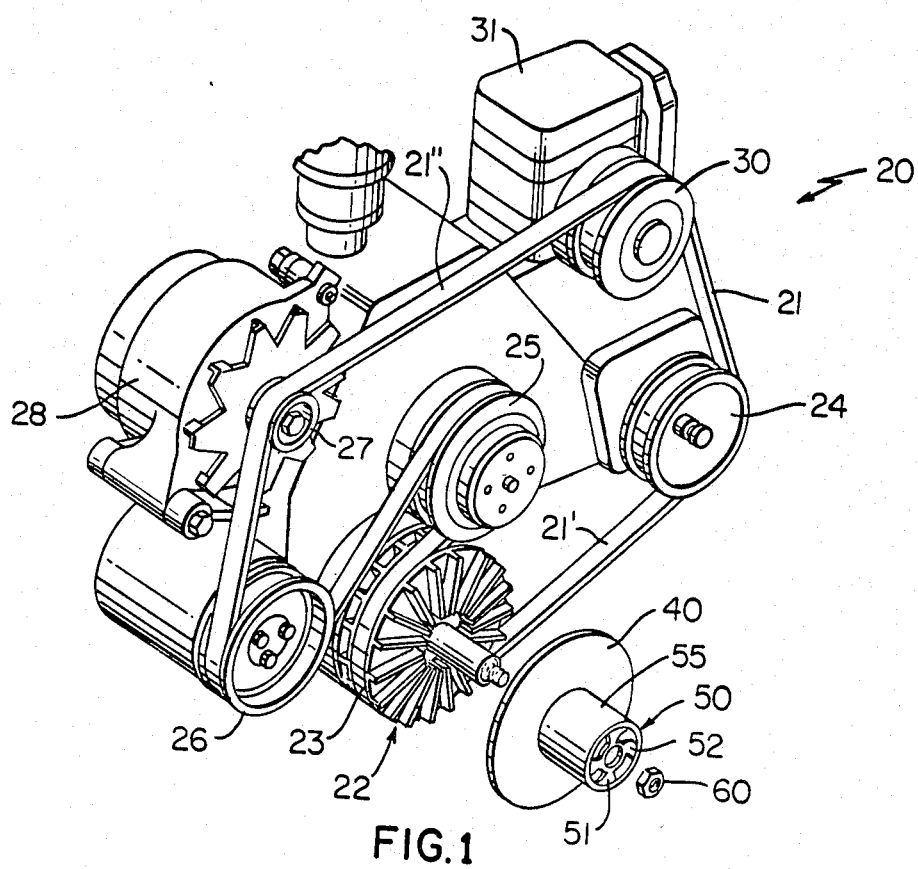
FIG. 1 is a fragmentary, isometric view looking toward the front end of an automotive engine which is adapted to utilize the pulley of this invention, FIG. 1 illustrating the pulley of this invention and having parts thereof exploded therefrom.

While the various features of this invention are hereinafter illustrated and described as providing a belt pulley for a particular motor vehicle engine, it is to be understood that the various features of this invention can be utilized singly or in any combination thereof to provide a belt pulley for other belt systems as desired.

Therefore, this invention is not to be limited to only the embodiment illustrated in the drawings, because the drawings are merely utilized to illustrate one of the wide variety of uses of this invention.

Figure 2:
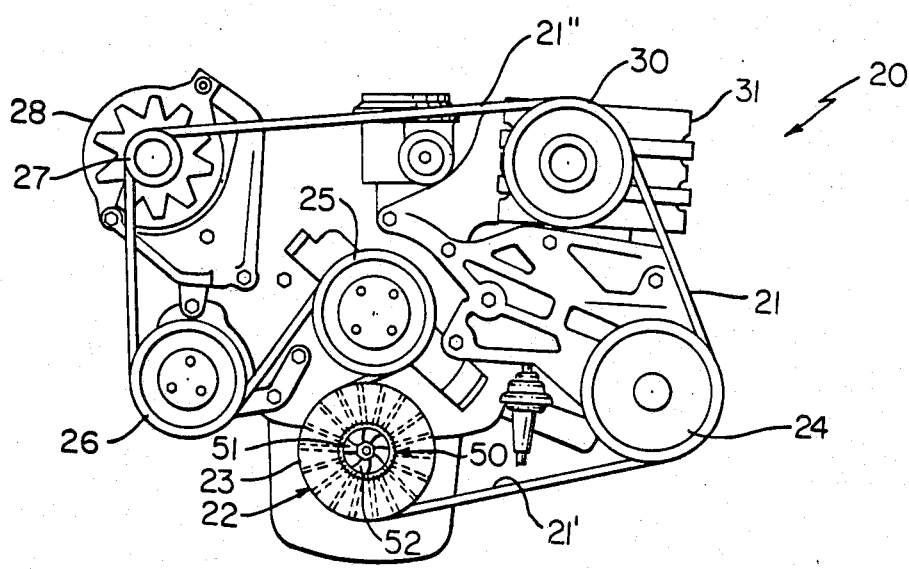
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved pulley of this invention being generally indicated by the reference numeral 22 in FIGS. 3-6, as well as FIGS. 1 and 2, and being adapted to be utilized to provide a cooling effect on the belt 21 in a manner hereinafter set forth.

The endless power transmission belt 21 may be of any suitable type known in the art and is preferably made primarily of a polymeric material. The belt 21 in FIGS. 1 and 2 is of a generally rectangular cross-sectional configuration and has a bottom driving surface 21' and a top driving surface 21" in a manner well known in the art, the belt 21 being ribbed or non-ribbed as desired.

However, it is to be understood that the various features of this invention as hereinafter set forth are adapted to operate on belt constructions having other cross-sectional configurations whereby the pulley of this invention illustrated in FIGS. 3-6 is illustrated as providing a pulley for belts that have a generally trapezoidal cross-sectional configuration as is well known for V-belt constructions with the understanding that the pulley of this invention can be modified in a manner well known in the art to operate on belts of other cross-sectional configurations as desired.

The belt 21 is driven by a pulley portion 23 of the pulley 22 of this invention which is operatively interconnected to the crankshaft of the engine 20 in a manner well known in the art whereby the pulley 22 is a driven sheave or pulley. The driving pulley 22 drives the belt 21 in an endless path and thereby drives a sheave or pulley 24 of a power steering device used in an automobile (not shown) utilizing the engine 20, a sheave or pulley 25 of an engine water pump, a sheave or pulley 26 of an air pump of a type used in an antipollution system for the engine 20, a sheave or pulley 27 of an engine electrical alternator 28 and a sheave or pulley 30 of a compressor 31 of an airconditioning system for the automobile utilizing the engine 20. All of the driven accessories, through their sheaves or pulleys 24, 25, 26, 27 and 30 impose a load on the belt 21 as is well known in the art whereby the same impose a heating load to the belt 21, the driving pulley 22 and engine 20 also imposing a heating load to the belt 21 as is well known in the art.

As previously stated, it is one feature of this invention to provide the pulley 22 with improved means that tend to cool the belt 21 during its operation and thereby extend its belt life.

In particular, the pulley 22 as illustrated in the drawings comprises a conventional pulley portion 23 and a pair of ventilating devices that are generally and respectively indicated by the reference numerals 32 and 32' in the drawings and each having a plurality of passage means passing therethrough, each passage means being generally indicated by the reference numeral 33.

In general, the ventilating devices 32 and 32' are of the type disclosed and claimed in the aforementioned U.S. Pat. No. 4,509,933, whereby this copending patent application is being incorporated into this disclosure by this reference hereto.

Figure 3:
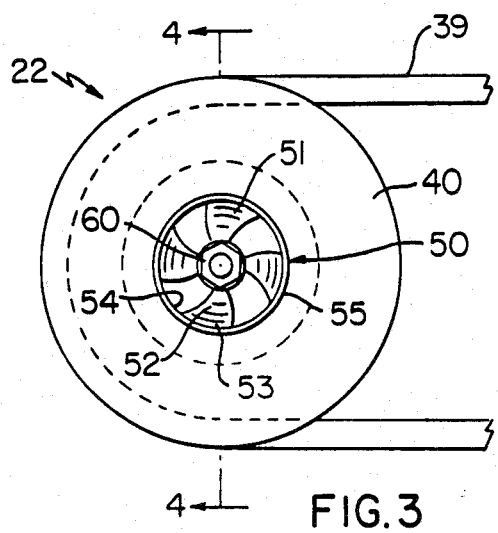
FIG. 3 is an enlarged fragmentary side view of the pulley of this invention that is utilized in FIGS. 1 and 2.
Figure 4:
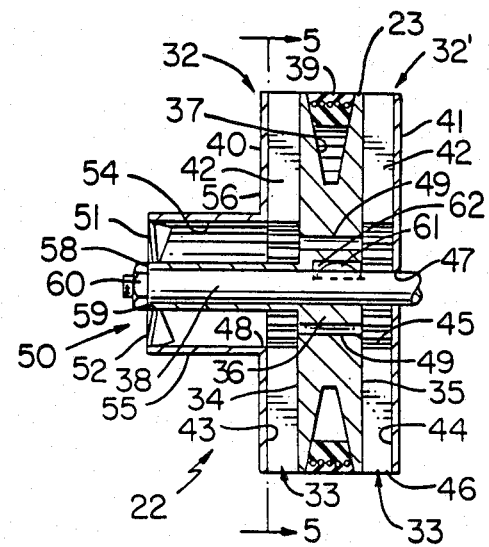
FIG. 4 is a cross-sectional view taken on line 4—4 of FIG. 3.
Figure 5:
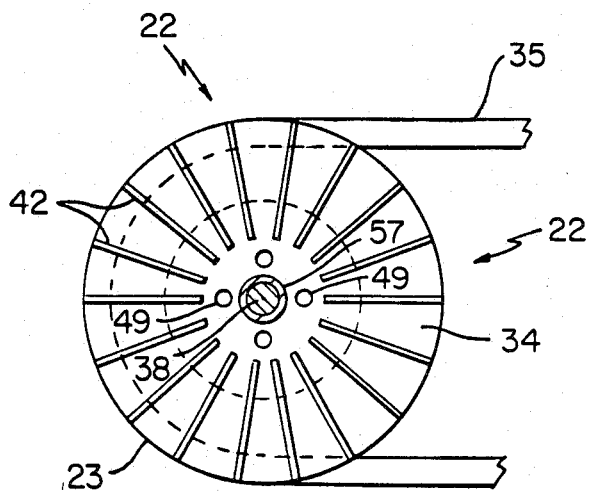
FIG. 5 is a cross-sectional view taken on line 5—5 of FIG. 4.
Figure 6:
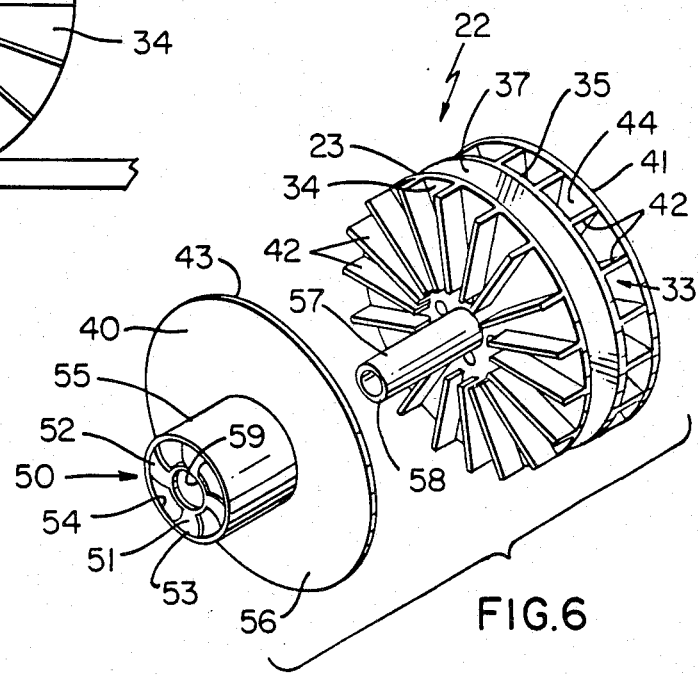
FIG. 6 is an exploded perspective view of the improved pulley of this invention.

The pulley portion 23 has opposed substantially parallel flat sides 34 and 35 and is provided with a hub 36 and a peripheral groove 37, the hub 36 being adapted to be secured to a suitable drive or driven shaft 38 in a manner well known in the art while the peripheral groove 37 is adapted to receive part of an endless transmission belt therein in a manner well known in the art which comprises the belt 21 in FIGS. 1 and 2 and a V-belt 39 in FIGS. 3-5.

The ventilating devices 32 and 32' respectively comprise substantially flat disk-like plates 40 and 41 secured against a plurality of substantially flat and radially extending vanes 42 integrally formed on the sides 34 and 35 of the pulley 23 and cooperating with the inner sides 43 and 44 of the plates 40 and 41 to define the plurality of radially disposed passages 33 with each passage 33 being disposed between an adjacent pair of vanes 42 and having an inlet 45 adapted to be disposed adjacent the hub 36 of the pulley 22 and an outlet 46 adapted to be disposed adjacent the peripheral groove 37 of the pulley 22.

The plate 41 has a central opening 47 passing therethrough of a size and configuration to permit the same to be disposed on the drive or driven shaft 38 while the plate 40 has a larger central opening 48 passing therethrough to provide an enlarged passage or opening leading to the inlets 45 of the passages 33 of the device 32 and to inlets 45 of the passages 33 of the device 32' through openings 49 formed through the hub 36 as illustrated in the drawings.

While the pulley portion 23 and ventilating devices 32 and 32' can be formed of any suitable material, it is believed that the same should be formed of material having a high coefficient of heat conductivity, such as metallic material, in order to optimize the amount of cooling from the air flowing through the passages 33.

In particular, as the pulley 22 is being rotated by the belt 39 or is being rotated by the shaft 38 as the case may be, it is believed that a centrifugal force is created through the rotation of the pulley 22 which will force an air flow through the passages 33 thereof from the inlets 45 thereof to the outlets 46 thereof and thereby in much the same manner as a Venturi arrangement will cause fresh air to continuously flow into the inlets 45 of the passages 33 whereby the constant flow of air through the opening 48 of the plate 40 and through the passages 33 will through conduction cool the pulley 22 and, thus, cool the belt 39 so that the pulley 22 provides a cooling effect on the belt 39 in the operation of the system utilizing the pulley 22 and belt 39, such as the system illustrated in FIGS. 1 and 2.

It is believed according to the teachings of this invention that the air flow through the passages 33 of the ventilating devices 32 and 32' can be augmented if a fluid flow forcing means of this invention that is generally indicated by the reference numeral 50 in the drawings is carried by the pulley 22.

In particular, the fluid forcing means 50 of this invention comprises a rotatably operable fan or blower-like member 51 carried by the plate 40 of the pulley 22 so that as the pulley 22 rotates, the rotatably operable fluid flow forcing means 50 rotates and thereby operates in unison with the pulley 22 to force air upstream of the inlets 45 of the passages 33 into the inlets 45 and thus through the passages 33 as the pulley 22 and the fluid flow forcing means 50 rotate about the axis of the hub 36 of the pulley 22 and thereby augments the flow of air through the passages 33 normally caused by the aforementioned centrifugal action. In this manner, it is believed that an increased cooling action is provided by the pulley 22 of this invention over the cooling action of a pulley that does not have the fluid forcing means 50 of this invention even though the same has the fluid flow passages 33.

The member 51 of the rotatably operable fluid flow forcing means 50 comprises a plurality of fan or blower-like blades 52 respectively having their outer ends 53 secured to the inner peripheral surface 54 of a tubular member or duct-like member 55 extending centrally from the opening 48 and outer side 56 of the plate 40 so as to be coaxial with the hub 36 of the pulley portion 23 as illustrated in the drawings, the duct-like member 55 being integral and one-piece with the plate 40 or being formed separately therefrom and subsequently secured thereto in any suitable manner.

If desired, the hub 36 of the pulley portion 23 can have a tubular extension 57 that has its outer free end 58 disposed in a central opening 59 of the fan or blower-like member 51 and through which the shaft 38 can extend and be fastened thereto by a nut 60 so as to prevent axial movement of the pulley 22 on the shaft 38 which has a part 61 thereof splined in a splined opening 62 of the hub 36 as illustrated in FIG. 4.

In this manner, the pulley 22 is adapted to be secured to the shaft 38 to either cause rotation of the shaft 38 or be driven thereby as the case may be so that the rotatably operable fluid flow forcing means 50 will rotate in unison with the pulley 22 to continuously force air to flow through the duct-like member 50 and opening 48 of the plate 40 into the inlets 45 of the passages 33 of the ventilating device 32 as well as through the openings 49 of the hub 36 to the inlets 45 of the passages 33 of the ventilating device 32' to affect not only cooling of the pulley portion 23 through conduction, but also affect cooling of the belt 39 through conduction as previously described.

While a particular structure for the passages 33 of the devices 32 and 32' have been previously set forth, it is to be understood that any of the passage forming structure of the aforementioned copending patent application can be utilized with the fluid forcing means 50 of this invention to provide improved cooling of the resulting pulley structure.

Also, it is obvious that if the pulley 22 of this invention is mounted so that the duct-like member 55 faces in a direction that the pulley 22 is being moved, such as on the front of the engine 20 as illustrated in FIGS. 1 and 2, the duct-like member 55 provides a ram effect to further direct air flow into the duct-like member 55 and, thus, through the passages 33 for the aforementioned cooling effect.

While the pulley 22 has been illustrated and described as having the inlets for the respective ventilating passages 33 adjacent the hub thereof while the outlets are respectively disposed adjacent the peripheral groove thereof, it is to be understood that the fluid flow through the passages 33 could occur in a reverse direction therethrough. For example, the fluid flow forcing means 50 could operate in a reverse direction to force fluid out of the duct 55 away from the pulley portion 23 so that the fluid will flow in opposition to the centrifugal force created by the rotating pulley from the outer periphery of the passages to the inner periphery thereof for the aforementioned cooling purposes. Therefore, while the terms "inlet" and "outlet" have been previously utilized in the specification and in the following claims to designate the openings of the passages respectively adjacent the hub and peripheral groove while the respective outlet thereof is disposed adjacent the hub whereby it is to be understood that in this description and in the following claims, the term "inlet" can be substituted for the word "outlet" and the term "outlet" can be substituted for the word "inlet" for each of the passage means set forth herein while the term "downstream" can be substituted for the term "upstream" to locate the fluid forcing means relative thereto.

It is also to be understood that through suitable shaping or directing of the outlets of the passage means of the pulley of this invention, the fluid leaving such outlets of the passage means can be directed to directly engage against the belt of the pulley so as to further tend to cool the same. For example, suitable shrouding can be provided either integral with the pulley or separate therefrom for directing the flow from the outlets of the passages thereof directly against the belt operating with such pulley.

Therefore, it can be seen that this invention not only provides an improved belt pulley, but also this invention provides an improved method of making such a belt pulley.

While the form and method of this invention now preferred have been illustrated and described as required by the Patent Statute, it is to be understood that other forms and method steps can be utilized and still fall within the scope of the appended claims.

What is claimed is:

1. In a belt pulley having a hub and a peripheral groove for receiving part of an endless belt therein that is to drive said pulley or be driven thereby whereby said pulley is adapted to be rotated about the axis of said hub, said pulley having means defining at least one passage means provided with an inlet adjacent said hub and an outlet adjacent said peripheral groove whereby fluid passing through said passage means from said inlet to said outlet thereof will tend to cool said pulley and/or said belt as said pulley rotates about said axis, the improvement comprising a rotatably operable fluid flow forcing duct-like member carried by said pulley so as to be rotated and thereby operated in unison with said pulley and being disposed upstream from said inlet for forcing fluid into said inlet and thus through said passage means and said pulley means as said pulley and said fluid flow forcing means rotate about said axis, said duct-like member having opposed ends and at least one fan blade, one of said ends of said duct-like member being disposed adjacent said inlet of said passage means, said blade being disposed in said duct-like member adjacent the other of said ends thereof.

2. In a method of making a belt pulley comprising the steps of forming said pulley with a hub and a peripheral groove for receiving part of an endless belt therein that is to drive said pulley or be driven thereby whereby said pulley is adapted to be rotated about the axis of said hub; and forming said pulley with at least one passage means provided with an inlet adjacent said hub and an outlet adjacent said peripheral groove whereby fluid passing through said passage means from said inlet to said outlet thereof will tend to cool said pulley and/or said belt as said pulley rotates about said axis, the improvement comprising the steps of disposing a rotatably operable fluid flow forcing duct-like member on said pulley so as to be rotated and thereby operated in unison with said pulley and be upstream from said inlet for forcing fluid into said inlet and thus through said passage means as said pulley and said fluid flow forcing means rotate about said axis, forming said duct-like member to have opposed ends and at least one fan blade, disposing one of said ends of said duct-like member adjacent said inlet of said passage means, and disposing said blade in said duct-like member adjacent the other of said ends thereof.

* * * * *